(12) United States Patent
Ishizuka

(10) Patent No.: US 9,323,040 B2
(45) Date of Patent: Apr. 26, 2016

(54) EYEPIECE LENS SYSTEM AND IMAGE OBSERVATION DEVICE

(75) Inventor: Kenichi Ishizuka, Hanamaki (JP)

(73) Assignees: RICOH INDUSTRIAL SOLUTIONS INC., Yokohama-shi (JP); SONY CORPORATION, Tokyo (JP)

( * ) Notice: Subject to any disclaimer, the term of this patent is extended or adjusted under 35 U.S.C. 154(b) by 107 days.

(21) Appl. No.: 14/240,840

(22) PCT Filed: Aug. 22, 2012

(86) PCT No.: PCT/JP2012/071752
§ 371 (c)(1),
(2), (4) Date: Feb. 25, 2014

(87) PCT Pub. No.: WO2013/027855
PCT Pub. Date: Feb. 28, 2013

(65) Prior Publication Data
US 2014/0218806 A1 Aug. 7, 2014

(30) Foreign Application Priority Data
Aug. 25, 2011 (JP) .................. 2011-184048

(51) Int. Cl.
G02B 25/00 (2006.01)
G02B 13/22 (2006.01)
G02B 27/02 (2006.01)
G02B 27/01 (2006.01)

(52) U.S. Cl.
CPC .............. *G02B 25/001* (2013.01); *G02B 13/22* (2013.01); *G02B 27/0172* (2013.01); *G02B 27/027* (2013.01)

(58) Field of Classification Search
CPC .... G02B 25/001; G02B 13/22; G02B 27/021; G02B 27/027; G02B 27/0172
USPC ......................................... 359/643–646, 630
See application file for complete search history.

(56) References Cited

U.S. PATENT DOCUMENTS

| | | | |
|---|---|---|---|
| 5,877,900 A * | 3/1999 | Omura | 359/644 |
| 5,969,873 A * | 10/1999 | Sugawara | 359/645 |
| 6,282,030 B1 * | 8/2001 | Hall | 359/644 |

(Continued)

FOREIGN PATENT DOCUMENTS

| | | |
|---|---|---|
| JP | 11 23984 | 1/1999 |
| JP | 2004 258653 | 9/2004 |

(Continued)

OTHER PUBLICATIONS

International Search Report Issued Nov. 27, 2012 in PCT/JP12/071752 Filed Aug. 22, 2012.

*Primary Examiner* — Jordan Schwartz
(74) *Attorney, Agent, or Firm* — Oblon, McClelland, Maier & Neustadt, L.L.P

(57) ABSTRACT

An eyepiece lens system forms a magnified virtual image of an object to be observed, the system including: a first group disposed adjacent to an image display device and having negative refractive power; and a second group disposed adjacent to the first group on a side closer to an eye and having positive refractive power; the first group including a cemented doublet lens of a biconcave lens and a biconvex lens, the second group including two or three positive lenses, being telecentric on the object side. The eyepiece lens system has satisfactory telecentricity on the object side and satisfactorily corrects aberration.

3 Claims, 5 Drawing Sheets

(56) References Cited

U.S. PATENT DOCUMENTS

| | | |
|---|---|---|
| 6,785,054 B1 | 8/2004 | Cahall |
| 7,738,179 B2 | 6/2010 | Nishi |
| 8,736,967 B1 * | 5/2014 | Browne et al. ............... 359/668 |
| 9,030,503 B2 * | 5/2015 | Moore ........................ 345/690 |

FOREIGN PATENT DOCUMENTS

| | | |
|---|---|---|
| JP | 2005 134867 | 5/2005 |
| JP | 2009 294527 | 12/2009 |
| JP | 2009 294528 | 12/2009 |
| JP | 2010 237638 | 10/2010 |

* cited by examiner 10.00 MM 10.00 MM

EYEPIECE LENS SYSTEM AND IMAGE OBSERVATION DEVICE

TECHNICAL FIELD

The present invention relates to an eyepiece lens system and an image observing apparatus.

BACKGROUND ART

Eyepiece lens systems that form magnified virtual images of objects have been widely used in various optical devices, such as loupes, microscopes, and the like.

In specific, an image of a region on an object to be observed is formed on the end at the object (hereinafter, object end) of an image transmitter composed of an optical fiber bundle of an endoscope, the image is transmitted to the end at the eyepiece lens (hereinafter, eyepiece end) of the optical fiber bundle, and the transmitted image is enlarged through the eyepiece lens system into a magnified virtual image of the object to be observed.

Alternatively, video content, for example, associated with virtual reality, movies, or games has been two-dimensionally displayed on a small image display device, such as a liquid-crystal display device, an EL display device, or any other device, in recent years; the two-dimensional image has been enlarged through an eyepiece lens system into a magnified virtual image of an object to be observed.

Eyepiece lens systems, the observer often wears on his/her head or face, should preferably be lightweight and compact.

An eyepiece lens system is also known that includes only four lenses and is lightweight and compact.

Known eyepiece lens systems have low telecentricity on the object side.

If the telecentricity is low on the object side, the observation through an eyepiece lens system of a two-dimensional image appearing on a liquid-crystal display device, an organic EL display device, or any other device or an image of an observed region formed on the object end of an optical fiber bundle of an endoscope may vary in brightness and color depending on the angle of view. This phenomenon precludes the acquisition of satisfactory high-resolution observed images.

Magnified virtual images observed through endoscopes or observed as video content associated with movies and games are required to have high resolution, while eyepiece lens systems are required to satisfactorily correct aberration.

CITATION LIST

Patent Literature

[PTL 1] Japanese Patent Application Laid-Open No. 11-23984

SUMMARY OF THE INVENTION

Technical Problem

A challenge to be solved is to provide an eyepiece lens system that has satisfactory telecentricity on the object side and can satisfactorily correct aberration and an image observing apparatus including the eyepiece lens system.

Solution to Problem

Aspect 1. An eyepiece lens system that forms a magnified virtual image of an object to be observed has the following characteristics.

The eyepiece lens system includes a first group disposed adjacent to the object and having negative refractive power; and a second group disposed adjacent to the first group on a side closer to an eye and having positive refractive power.

The first group includes a cemented doublet lens of a biconcave lens and a biconvex lens.

The second group includes two or three positive lenses.

The object side is telecentric, and the focal length of the entire system F (>0), the focal length of the first group F1 (<0), and the focal length of the second group F2 (>0) satisfy the following conditions:

$$-5 < F1/F < -1; \text{ and} \quad (1)$$

$$0.5 < F2/F < 3. \quad (2)$$

Aspect 2. The eyepiece lens system according to Aspect 1 further includes a positive meniscus lens having aspherical surfaces on both sides and having a concave surface facing the object, the positive meniscus lens being disposed on the side of an image display device in the first lens group and functioning as a field-curvature correction positive lens.

Aspect 3. An image observing apparatus for observation of a magnified virtual image of a two-dimensional image, the apparatus comprises an optical system that forms the virtual image of the two-dimensional image, the optical system comprising at least one eyepiece lens system according to Aspect 1 or 2.

Aspect 4. The image observing apparatus according to Aspect 3 includes an image display device that displays the two-dimensional image; and at least one eyepiece lens system according to Aspect 1 or 2, wherein the image observing apparatus is a head-mount type.

Additional descriptions will now be provided.

Conditions (1) and (2) define the appropriate ranges of the refractive power of the first and second groups in comparison with the refractive power of the entire eyepiece lens system.

The first group, which has negative refractive power, diverges light from the object to be observed to the eye.

The diverging effect of the first group increases the angle of view even for the observation of small objects, forms magnified virtual images of the object to be observed with a large angle of view, resulting in ready observation of the magnified virtual image.

A smaller absolute value for the parameter F1/F of Condition (1) increases the negative refractive power in the first group and the divergence of the light of the object to the eye. A parameter F1/F below the lower limit of Condition (1) causes excess divergence, thus the second group that converges light beams from the object to be observed toward the eye must have a large lens diameter. As a result, the entire eyepiece lens system will be large and expensive.

Furthermore, the telecentricity on the object side cannot be readily established.

A parameter F1/F exceeding the upper limit of Condition (1) causes insufficient divergence. Thus, the establishment of a readily observable range of a horizontal angle of view of, for example, 40 to 45 degrees requires the second group to have high positive refractive power.

Such an increase in the positive refractive power of the second group may cause aberration that is difficult to correct.

The light beams diverged at the first group are converged toward the eye by the second group having positive refractive power.

A second group including a single positive lens is insufficient for aberration correction. As described above, a preferred second group includes two or three positive lenses among which the ability of aberration correction is distributed.

A smaller value for the parameter F2/F of Condition (2) increases the positive refractive power in the second group. A parameter F2/F below the lower limit of Condition (4) causes excess positive refractive power. Thus, an increase in the positive refractive power of the second group may cause aberration that is difficult to correct.

A parameter F2/F exceeding the upper limit of Condition (2) occasionally causes insufficient positive refractive power of the second group, which may decrease the distance between the eyepiece lens system and the eye. Thus, the readily observable range of a horizontal angle of view of 40 to 45 degrees cannot be readily established.

Advantageous Effects of Invention

As described above, the present invention provides a novel eyepiece lens system and an image observing apparatus.

The eyepiece lens system, as described above, has satisfactory telecentricity on the object side with invariable brightness and color independent of the angle of view of the image and, as described below, has satisfactory performance for the formation of a high-resolution magnified virtual image.

The eyepiece lens system according to Aspect 2 has an additional field-curvature correction positive lens on the side of the image display device of the first group. Thus, a large magnified virtual image can be observed with less distortion due to field curvature.

DESCRIPTION OF EMBODIMENTS

Embodiments will now be described below.

Figure 1:
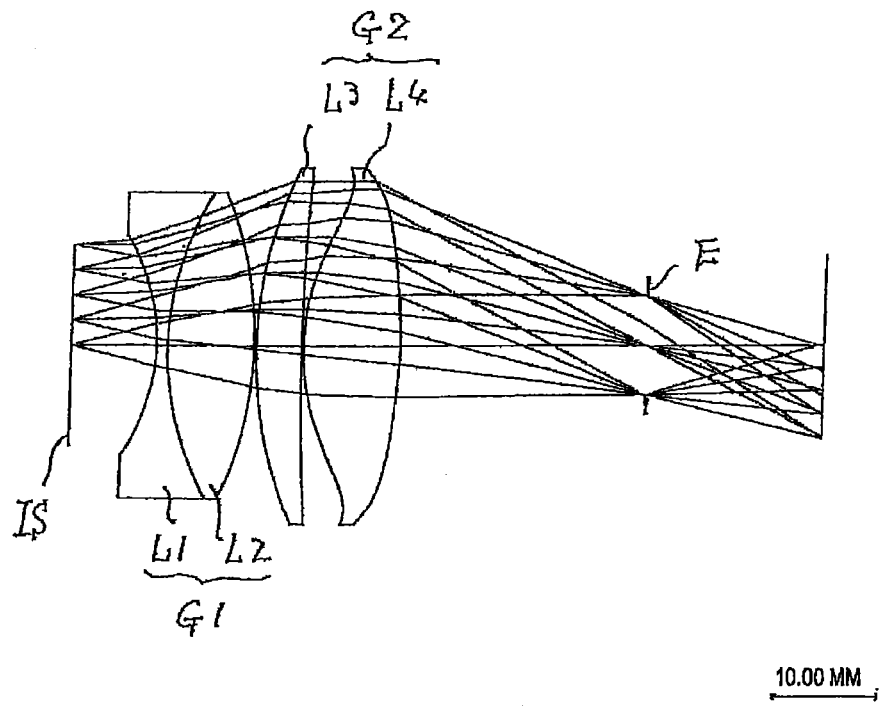
FIG. 1 illustrates the lens configuration of an eyepiece lens system according to Embodiment 1.
Figure 2:
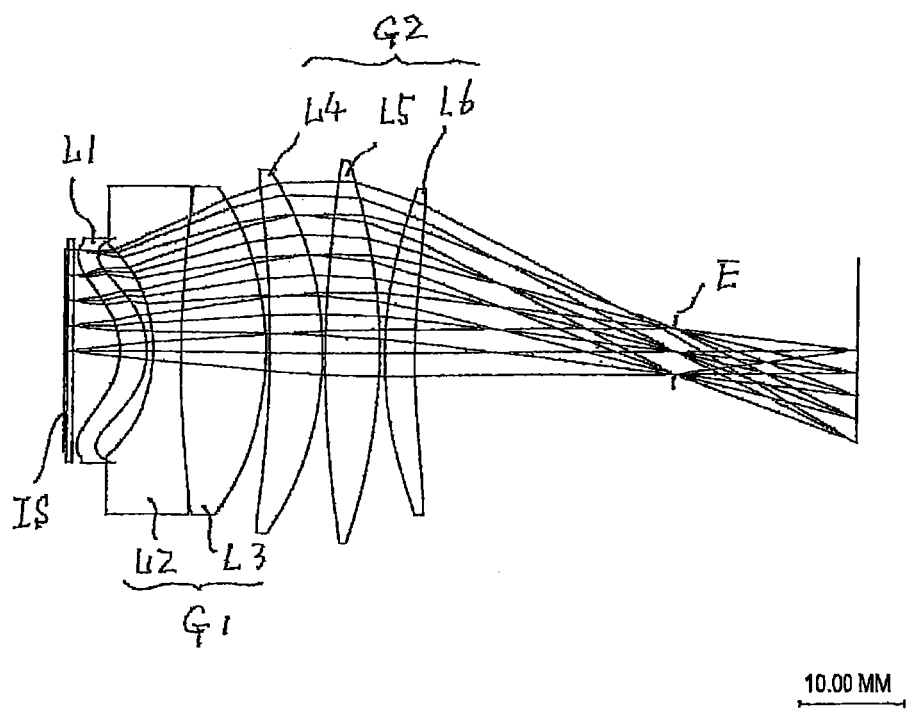
FIG. 2 illustrates the lens configuration of an eyepiece lens system according to Embodiment 2.
Figure 3:
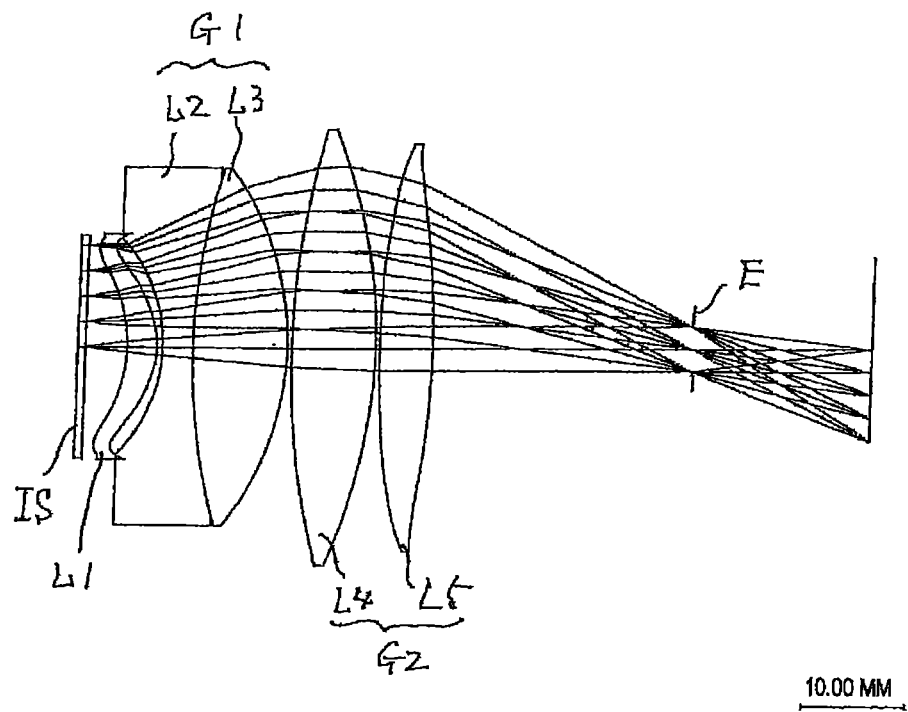
FIG. 3 illustrates the lens configuration of an eyepiece lens system according to Embodiment 3.

FIGS. 1 to 3 illustrate three exemplary eyepiece lens systems according to the embodiments. These eyepiece lens systems correspond to eyepiece lenses according to Embodiments 1 to 3 described below.

These eyepiece lens systems according to the embodiments are intended for the observation of a two-dimensional image of an object to be observed appearing on a liquid-crystal display device, an organic EL display device (hereinafter, either of which is referred to as an image display device), or any other device.

For simplification, common reference numerals are used in FIGS. 1 to 3. In FIGS. 1 to 3, the left side of the drawings is the "image-display side," the right side is the "eye side." The reference sign IS indicates the "image display surface of the image display device." Images are displayed on the image display surface IS in the form of two-dimensional images.

Reference sign G1 indicates a first group, and reference sign G2 indicates a second group.

Reference sign E indicates the pupil of an eye.

The lenses of an eyepiece lens system are numbered from L1 to L6 in order from the image display surface IS, as illustrated in FIGS. 1 to 3.

The eyepiece lens system according to the embodiment illustrated in FIG. 1 includes four lenses L1 to L4. The two lenses L1 and L2 adjacent to the image display surface IS belong to a first group G1 having negative refractive power.

The lens L1 is a biconcave lens having a large curvature on the surface facing the image display surface; the lens L2 is a biconvex lens; and the lenses L1 and L2 are paired into a cemented doublet lens.

The lenses L3 and L4 belong to a second group G2 having positive refractive power.

The lenses L3 and L4 are both positive lenses, the lens L3 being a positive meniscus lens having a convex surface facing the image display surface IS, the lens L4 being a biconvex lens. Both surfaces of the lens L4 are aspherical; the negative curvature is inverted to a positive curvature near the optical axis, in the peripheral area of the surface facing the image display surface IS.

That is, the two lenses L3 and L4 in the second group G2 share the function of aberration correction. Both surfaces of the lens L4, closest to the eye, are aspherical and correct distortion and field curvature.

The eyepiece lens system according to the embodiment illustrated FIG. 2 includes six lenses L1 to L6. The lens L1 closest to the image surface IS is a positive meniscus lens or field-curvature correction lens having a concave surface facing the object and aspherical surfaces on both sides.

The field-curvature correction lens L1 or field flattener lens decreases field curvature and flattens the imaging surface of a virtual image but has low power.

The lenses L2 and L3 next to the lens L1 belong to a first group G1, and the three lenses L4, L5, and L6 disposed close to the eye belong to a second group G2.

The lenses L2 and L3 of the first lens group G1 are paired into a cemented doublet lens.

The lens L1 is a biconcave lens having a larger curvature on the surface facing the image display surface IS, while the lens L2 is a biconvex lens.

The three lenses L4, L5, and L6 of the second group G2 are positive lenses; the lens L4 is a positive meniscus lens having a concave surface facing the image display surface IS; the lens L5 is a biconvex lens; and the lens L6 is a positive meniscus lens having a convex surface facing the image display surface IS.

The lens L6 has aspherical surfaces on both sides.

The eyepiece lens system according to the embodiment illustrated FIG. 3 includes five lenses L1 to L5. The lens L1 closest to the image display surface IS is a positive meniscus lens or field-curvature correction positive lens having a concave surface facing the object and aspherical surfaces on both sides.

The field-curvature correction positive lens L1 is a field flattener lens with low power.

The two lenses L2 and L3 next to the lens L1 belong to a first group G1, and the two lenses L4 and L5 disposed close to the eye belong to a second group G2.

The lenses L2 and L3 in the first group G1 are paired into a cemented doublet lens; the lens L1 is a biconcave lens with a large curvature on the surface facing the image display surface; and the lens L2 is a biconvex lens.

The lenses L4 and L5 in the second group G2 are both positive lenses; the lens L4 is a biconvex lens; and the lens L5 is also a biconvex lens. The lens L5 has aspherical surfaces on both sides.

Figure 4:
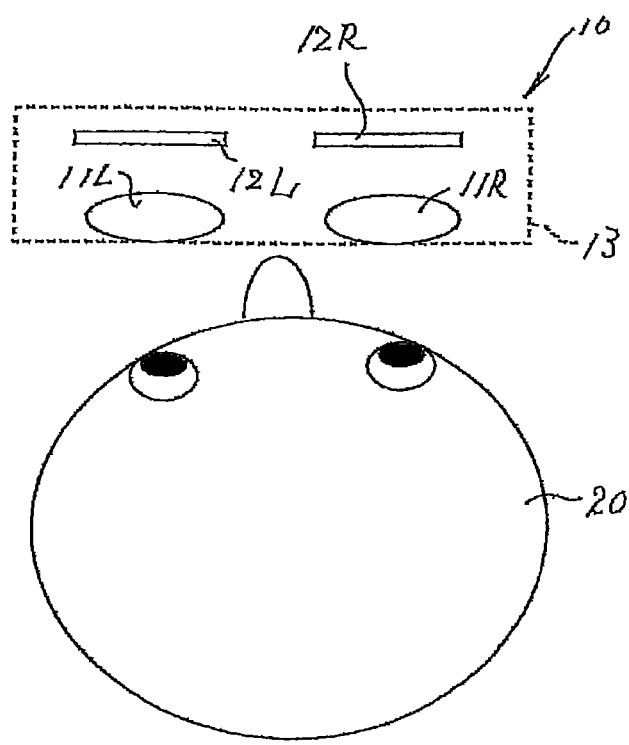
FIG. 4 illustrates an image observing apparatus according to an embodiment.

FIG. 4 illustrates a head-mountable image observing apparatus including an eyepiece lens system according to an embodiment.

FIG. 4 illustrates an image observing apparatus 10 and the head of an observer 20.

The image observing apparatus 10 has a casing 13 that accommodates the essential components i.e., eyepiece lens systems 11L and 11R and image display devices 12L and 12R in a predetermined arrangement.

The casing 13 is attachable to the head of the observer 20 with an appropriate attachment, such as a band, a frame, or any other device.

The eyepiece lens system 11L and the image display device 12L are for the left eye, and the eyepiece lens system 11R and the image display device 12R are for the right eye.

The eyepiece lens systems 11L and 11R may be any of those according to Aspects 1 and 2 described above, more specifically, any of those described in Embodiments 1 to 3 below.

The image display devices 12L and 12R may each be a liquid-crystal display device, EL display device, any other device. The two-dimensional images appearing on the image display devices 12L and 12R are objects observed through the eyepiece lens systems 11L and 11R.

Embodiments

Three embodiments will now be described.

In Embodiments 1 to 3 described below, the surface number indicates the order of the lens surface counted from the object side, the reference sign R indicates the curvature radius of each lens surface, and the reference sign D indicates the distance between any two adjacent surfaces lenses.

Reference sign N indicates the refractive index for the d line of the lens material, and ν indicates the Abbe number.

The aspherical surfaces are represented by the following known expression:

$$X=(H^2/R)/[1+\{1-k(H/r)^2\}^{1/2}]+A \cdot H^4+B \cdot H^6+C \cdot H^8+D \cdot H^{10}+E \cdot H^{12}+\ldots$$

where X represents the shift in the direction of the optical axis at a height H from the optical axis with reference to the apex of a surface; k represents the constant of the cone; A, B, C, D, E . . . represent higher order aspherical coefficients; and R represents the radius of paraxial curvature. The unit for the dimension of length is mm.

Embodiment 1

Embodiment 1 is a detailed example of an eyepiece lens system according to the embodiment described with reference to FIG. 1.

Table 1 shows the lens data of Embodiment 1, and Table 2 shows aspherical data.

TABLE 1

| Surface No. | R | D | N | ν | Remarks |
|---|---|---|---|---|---|
| 1 |  | 8.0 |  |  |  |
| 2 | −17.6 | 1.0 | 1.9 | 19 |  |
| 3 | 26.3 | 8.3 | 1.8 | 43 |  |
| 4 | −31.0 | 0.2 |  |  |  |

TABLE 1-continued

| Surface No. | R | D | N | ν | Remarks |
|---|---|---|---|---|---|
| 5 | 35.9 | 4.5 | 1.8 | 45 |  |
| 6 | 171.5 | 0.2 |  |  |  |
| 7 | 18.5 | 9.6 | 1.5 | 56 | Aspherical |
| 8 | −37.5 | 24.0 |  |  | Aspherical |
| 9 |  |  |  |  | Pupil (φ9) |

TABLE 2

| Aspherical Cefficient | K | A | B | C | D |
|---|---|---|---|---|---|
| 7 | −1.7 | 2.2E−05 | −1.6E−07 | 1.1E−10 | −1.2E−12 |
| 8 | 3.4 | 6.9E−05 | −3.6E−07 | 8.6E−10 | −1.1E−12 |

The aspherical coefficient may be expressed, for example, as 1.6·E−04, which represents $1.6 \times 10^{-4}$. This holds in other embodiments.

The eyepiece lens system according to Embodiment 1 has the following focal lengths:

the focal length of the entire system=F=19.2 mm;

the focal length of the first group G1=F1=−46.8 mm; and the focal length of the second group G2=F2=27.6 mm.

These relations lead to:

the parameter of Condition (1)=F1/F=−2.4; and the parameter of Condition (2)=F2/F=1.4.

The diameter of a pupil E is 9 mm; the eye relief (distance from the surface of the lens closest to the eye to the eye (pupil)) is 24 mm; the observation distance of the virtual image is 10 m; and the horizontal angle of view is 45 degrees.

If the eyepiece lens systems according to Embodiment 1 are used as the eyepiece lens systems 11L and 11R of the image observing apparatus in FIG. 4, the convergence angle is determined between the optical axes of the eyepiece lens systems 11L and 11R such that the observed images are superposed at an observation distance of 10 m.

The eyepiece lens system according to Embodiment 1 has a large pupil diameter of 9 mm mainly for high resolution on the axis.

FIG. 5 is an aberration diagram for the eyepiece lens system according to Embodiment 1.

Figure 5A:
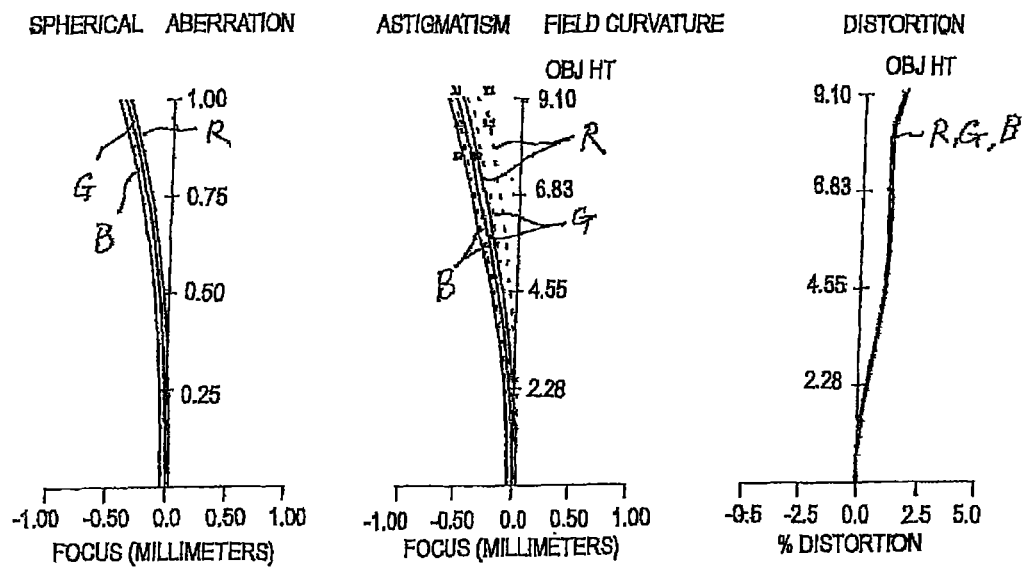
FIG. 5(a) is an aberration diagram for Embodiment 1.
Figure 5B:
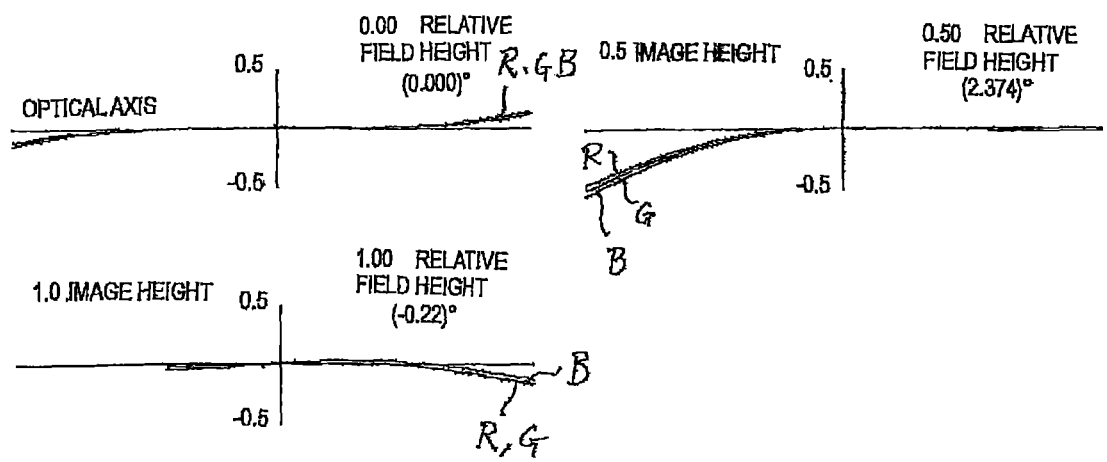
FIG. 5(b) is an aberration diagram for Embodiment 1.

FIG. 5(a) illustrates longitudinal aberration, and FIG. 5(b) illustrates transversal aberration.

In the aberration diagrams, reference sign R indicates light having a wavelength of 629 nm, reference sign G indicates light having a wavelength of 538 nm, and reference sign B indicates light having a wavelength of 458 nm. These relations hold for the aberration diagrams of other embodiments described below.

Embodiment 2

Embodiment 2 is a detailed example of an eyepiece lens system according to the embodiment described with reference to FIG. 2.

Table 3 shows the lens data of Embodiment 2, and Table 4 shows aspherical data.

TABLE 3

| Surface No. | R | D | N | v | Remarks |
|---|---|---|---|---|---|
| 1 | | 0.2 | | | |
| 2 | | 0.5 | 1.5 | 64 | Glass Cover |
| 3 | | 4.4 | | | |
| 4 | −7.0 | 2.5 | 1.5 | 56 | Aspherical |
| 5 | −6.1 | 0.6 | | | Aspherical |
| 6 | −13.1 | 2.5 | 1.9 | 19 | |
| 7 | 100.0 | 8.0 | 1.9 | 41 | |
| 8 | −25.8 | 0.4 | | | |
| 9 | −102.9 | 5.2 | 1.6 | 63 | |
| 10 | −27.7 | 0.3 | | | |
| 11 | 97.2 | 5.2 | 1.6 | 63 | |
| 12 | −49.6 | 0.5 | | | |
| 13 | 34.7 | 3.0 | 1.5 | 56 | Aspherical |
| 14 | 57.6 | 25.0 | | | Aspherical |
| 15 | | | | | Pupil (φ4) |

TABLE 4

| Apherical Cefficient | K | A | B | C | D |
|---|---|---|---|---|---|
| 4 | −0.9 | −3.9E−04 | 1.6E−05 | −1.3E−07 | 5.3E−10 |
| 5 | −0.9 | −8.0E−05 | 5.9E−06 | −2.9E−08 | 3.3E−10 |
| 13 | 1.9 | 4.8E−06 | −6.2E−08 | 4.2E−11 | −4.9E−13 |
| 14 | −68.0 | 2.5E−06 | 1.6E−08 | −3.0E−10 | 3.5E−13 |

Embodiment 3

Embodiment 3 is a detailed example of an eyepiece lens system according to the embodiment described with reference to FIG. 3.

Table 5 shows the lens data of Embodiment 3, and Table 6 shows aspherical data.

TABLE 5

| Surface No. | R | D | N | v | Remarks |
|---|---|---|---|---|---|
| 1 | | 0.2 | | | |
| 2 | | 0.7 | 1.5 | 64 | Glass Cover |
| 3 | | 3.8 | | | |
| 4 | −9.4 | 2.9 | 1.5 | 56 | Aspherical |
| 5 | −7.3 | 0.6 | | | Aspherical |
| 6 | −13.1 | 3.0 | 1.9 | 19 | |
| 7 | 52.3 | 9.3 | 1.9 | 41 | |
| 8 | −23.9 | 0.4 | | | |
| 9 | 70.9 | 8.0 | 1.7 | 50 | |
| 10 | −45.7 | 0.4 | | | |
| 11 | 91.9 | 5.2 | 1.5 | 56 | Aspherical |
| 12 | −69.5 | 25.0 | | | Aspherical |
| 13 | | | | | Pupil (φ4) |

TABLE 6

| Apherical Cefficient | K | A | B | C | D | E |
|---|---|---|---|---|---|---|
| 4 | −5.0 | 1.6.E−04 | −1.3.E−05 | 1.6.E−07 | −3.2.E−10 | |
| 5 | −0.7 | 4.2.E−04 | −5.1.E−06 | −5.2.E−09 | 6.6.E−10 | |
| 11 | 7.6 | 8.4.E−06 | −4.5.E−08 | 2.9.E−10 | −8.4.E−13 | 1.1.E−15 |
| 12 | 3.6 | −4.5.E−06 | 6.4.E−08 | −1.2.E−10 | −9.6.E−15 | 3.9.E−16 |

The eyepiece lens system according to Embodiment 2 has the following focal lengths:
the focal length of the entire system=F=19.0 mm;
the focal length of the first group G1=F1=−43.1 mm; and
the focal length of the second group G2=F2=24.2 mm.
These relations lead to:
the parameter of Condition (1)=F1/F=−2.3; and
the parameter of Condition (2)=F2/F=1.3.

The diameter of a pupil E is 4 mm; the eye relief is 25 mm; the observation distance of the virtual image is 10 m; and the horizontal angle of view is 45 degrees.

If the eyepiece lens systems according to Embodiment 2 are used as the eyepiece lens systems 11L and 11R of the image observing apparatus in FIG. 4, the convergence angle between the optical axes of the eyepiece lens systems 11L and 11R is determined such that the observed images are superposed at an observation distance of 10 m.

The eyepiece lens system according to Embodiment 2 has a pupil diameter of 4 mm, which is the average diameter of normal pupils, mainly for alleviation of the deterioration of the observed image due to shifting/tilting of the pupil rather than resolution on the axis.

FIG. 6 is an aberration diagram for the eyepiece lens system according to Embodiment 2.

Figure 6A:
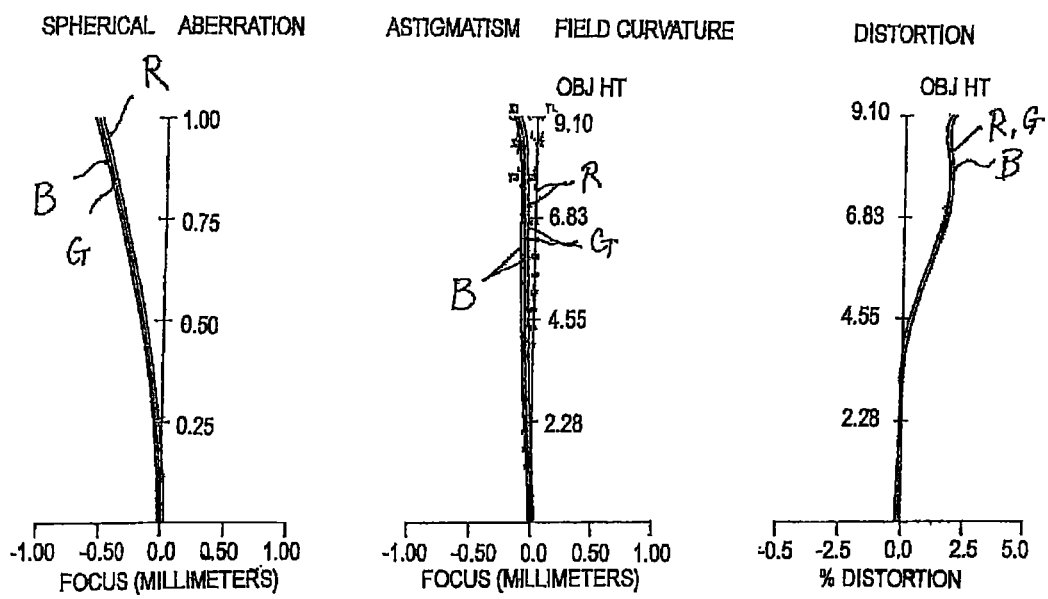
FIG. 6(a) is an aberration diagram for Embodiment 2.
Figure 6B:
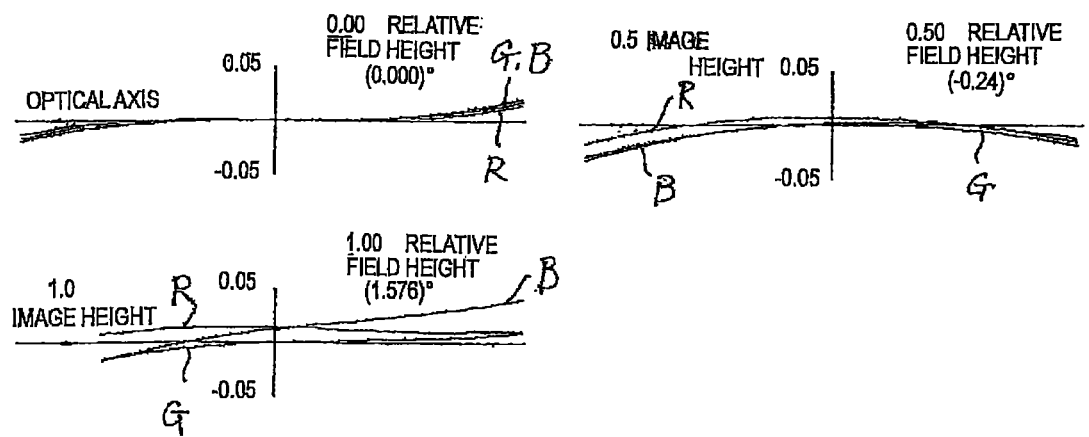
FIG. 6(b) is an aberration diagram for Embodiment 2.

FIG. 6(a) illustrates longitudinal aberration, and FIG. 6(b) illustrates transversal aberration.

The eyepiece lens system according to Embodiment 3 has the following focal lengths;
the focal length of the entire system=F=18.9 mm;
the focal length of the first group G1=F1=−55.0 mm; and
the focal length of the second group G2=F2=26.9 mm.
These relations lead to:
the parameter of Condition (3)=F1/F=−2.9; and
the parameter of Condition (4)=F2/F=1.4.

The diameter of a pupil E is 4 mm; the eye relief is 25 mm; the observation distance of the virtual image is 10 m; and the horizontal angle of view is 45 degrees.

If the eyepiece lens systems according to Embodiment 3 are used as the eyepiece lens systems 11L and 11R of the image observing apparatus in FIG. 4, the convergence angle between the optical axes of the eyepiece lens systems 11L and 11R is determined such that the observed images are superposed at an observation distance of 10 m.

The eyepiece lens system according to Embodiment 3 has a pupil diameter of 4 mm, which is the average diameter of normal pupils mainly for alleviation of the deterioration of the observed image due to shifting/tilting of the pupil rather than resolution on the axis. The deterioration of the observed image due to shifting/tilting of the pupil is alleviated more than that in Embodiment 2.

FIG. 7 is an aberration diagram for the eyepiece lens system according to Embodiment 3.

Figure 7A:
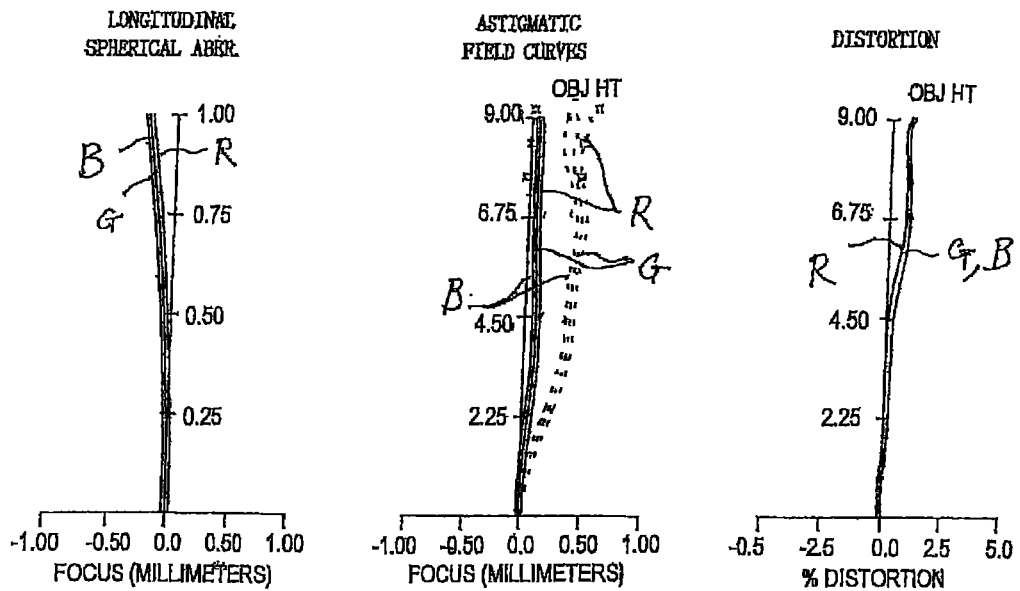
FIG. 7(a) is an aberration diagram for Embodiment 3.
Figure 7B:
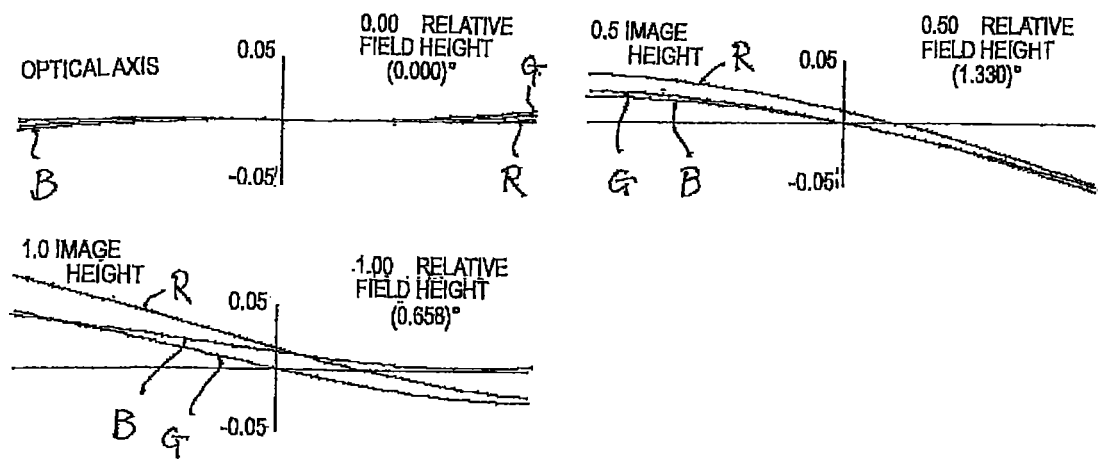
FIG. 7(b) is an aberration diagram for Embodiment 3.

FIG. 7(a) illustrates longitudinal aberration, and FIG. 7(b) illustrates transversal aberration.

The eyepiece lens systems according to Embodiments 1 to 3 satisfactorily correct the aberration and have satisfactory performance.

The lens L1, which is closest to the image display surface IS, of the eyepiece lenses according to Embodiments 2 and 3 is a positive meniscus lens or field-curvature correction positive lens that has a concave surface facing the object and aspherical surfaces on both sides.

The field-curvature correction positive lens L1 enables more efficient correction of the astigmatism and field curvature than that of the eyepiece lens system according to Embodiment 1.

INDUSTRIAL APPLICABILITY

An eyepiece lens system that has satisfactory performance and telecentricity on the object side and that can form a high-resolution magnified virtual image can produce observed images without varying brightness and color depending on the angle of view of the image, when mounted on an image observing apparatus of a head-mount type, for example.

REFERENCE SIGNS LIST

G1 first group
G2 second group
IS image display surface
E pupil
10 image observing apparatus
11L, 11R eyepiece lens system
12L, 12R image display device

The invention claimed is:

1. An eyepiece lens system that forms a magnified virtual image of an object to be observed, the system comprising:
a first group disposed adjacent to the object and having negative refractive power;
a second group disposed adjacent to the first group on a side closer to an eye and having positive refractive power; and
a positive meniscus lens having aspherical surfaces on both sides and having a concave surface facing an image display device, the positive meniscus lens being disposed on the object side of the first group and functioning as a field-curvature correction positive lens, wherein
the first group includes a cemented doublet lens of a biconcave lens and a biconvex lens,
the second group includes three positive lenses,
the object side being telecentric, and
the focal length of the entire system F with F>0, the focal length of the first group F1 with F1<0, and the focal length of the second group F2 with F2>0, satisfying the following conditions:

$$-5 < F1/F < -1; \text{ and} \quad (1)$$

$$0.5 < F2/F < 3. \quad (2)$$

2. An image observing apparatus for observation of a magnified virtual image of a two-dimensional image, the apparatus comprising:
an optical system that forms the virtual image of the two-dimensional image, the optical system comprising at least one eyepiece lens system according to claim 1.

3. The image observing apparatus according to claim 2, further comprising:
an image display device that displays the two-dimensional image; and
the at least one eyepiece lens system,
wherein the image observing apparatus is of a head-mount type.

* * * * *